US011619780B2

(12) United States Patent
Zhang et al.

(10) Patent No.: US 11,619,780 B2
(45) Date of Patent: Apr. 4, 2023

(54) VARIABLE DUAL-DIRECTIONAL THERMAL COMPENSATOR FOR ARRAYED WAVEGUIDE GRATING (AWG) MODULES

(71) Applicant: Molex, LLC, Lisle, IL (US)

(72) Inventors: Shuyu Zhang, Fremont, CA (US); Glenn Lee, Fremont, CA (US); Mike Chia Huang, San Jose, CA (US); Taizhong Huang, Zhuhai (CN)

(73) Assignee: Molex, LLC, Lisle, IL (US)

( * ) Notice: Subject to any disclaimer, the term of this patent is extended or adjusted under 35 U.S.C. 154(b) by 63 days.

(21) Appl. No.: 17/430,971

(22) PCT Filed: Feb. 28, 2019

(86) PCT No.: PCT/US2019/019921
§ 371 (c)(1),
(2) Date: Aug. 13, 2021

(87) PCT Pub. No.: WO2020/176089
PCT Pub. Date: Sep. 3, 2020

(65) Prior Publication Data
US 2022/0137291 A1    May 5, 2022

(51) Int. Cl.
*G02B 6/12*    (2006.01)
(52) U.S. Cl.
CPC ........ *G02B 6/1203* (2013.01); *G02B 6/12011* (2013.01); *G02B 6/12033* (2013.01)
(58) Field of Classification Search
CPC .............. G02B 6/1203; G02B 6/12011; G02B 6/12033; G02B 6/4215; G02B 6/4267
See application file for complete search history.

(56) References Cited

U.S. PATENT DOCUMENTS 6,477,299 B1 * 11/2002 Beall ...................... C03C 27/06
385/141
7,068,869 B1 * 6/2006 Araujo .................... G01L 1/246
385/13
(Continued)

FOREIGN PATENT DOCUMENTS

| CN | 101008693 A | 8/2007 |
| CN | 102540350 B | 4/2014 |

(Continued)

OTHER PUBLICATIONS

International Search Report and Written Opinion received for PCT Application No. PCT/US2019/019921, dated Nov. 25, 2019, 9 pages.

(Continued)

*Primary Examiner* — Ellen E Kim

(57) ABSTRACT

A thermal compensator, for use in connection with arrayed waveguide grating (AWG) modules which are, in turn, utilized in conjunction with wavelength multiplexing and de-multiplexing within optical networks, is disclosed. The thermal compensator comprises a bow-shaped frame member, a central bar member, and a screw. The bow-shaped frame member is characterized by a higher or great coefficient of thermal expansion (CTE) than that of the central bar member such that the bow-shaped frame member can expand and elongate at a greater rate than can the central bar member under hot temperature conditions, however, under cold temperature conditions, the rate of contraction of the bow-shaped member is effectively retarded by the slower rate of contraction of the central bar member. The bow-shaped frame member is adapted to be attached to a movable section of an athermal arrayed waveguide grating (AAWG) module such that the expansion and contraction movements of the bow-shaped member influence the movement of a movable section of the athermal arrayed waveguide grating (Continued)

(AAWG) module in order to maintain the proper focus of the athermal arrayed waveguide grating (AAWG) module across disparate temperature conditions within which the athermal arrayed waveguide grating (AAWG) module is designed to operate.

20 Claims, 7 Drawing Sheets

(56) References Cited

U.S. PATENT DOCUMENTS

| | | | |
|---|---|---|---|
| 7,856,888 B2* | 12/2010 | Ferguson | G01B 11/18 385/13 |
| 2002/0154862 A1 | 10/2002 | Guerin et al. | |
| 2004/0208417 A1 | 10/2004 | Purchase et al. | |
| 2004/0234200 A1 | 11/2004 | Jennings et al. | |
| 2008/0199130 A1 | 8/2008 | Hasegawa et al. | |
| 2013/0308904 A1 | 11/2013 | McGinnis et al. | |
| 2015/0309257 A1* | 10/2015 | Huang | G02B 6/12026 385/14 |
| 2021/0041626 A1* | 2/2021 | Kim | G02B 6/13 |

FOREIGN PATENT DOCUMENTS

| | | |
|---|---|---|
| CN | 107490823 A | 12/2017 |
| JP | 2006284632 A | 10/2006 |
| JP | 2007065562 A | 3/2007 |
| JP | 2007536567 A | 12/2007 |
| WO | 2018036035 A1 | 3/2018 |

OTHER PUBLICATIONS

Extended European Search Report received for EP Application No. 19916583.8, dated Aug. 25, 2022, 07 Pages.

Office Action received for JP Application No. 2021-549553, dated Aug. 2, 2022, 11 Pages (6 Pages of English Translation and 5 Pages of Official notification).

* cited by examiner

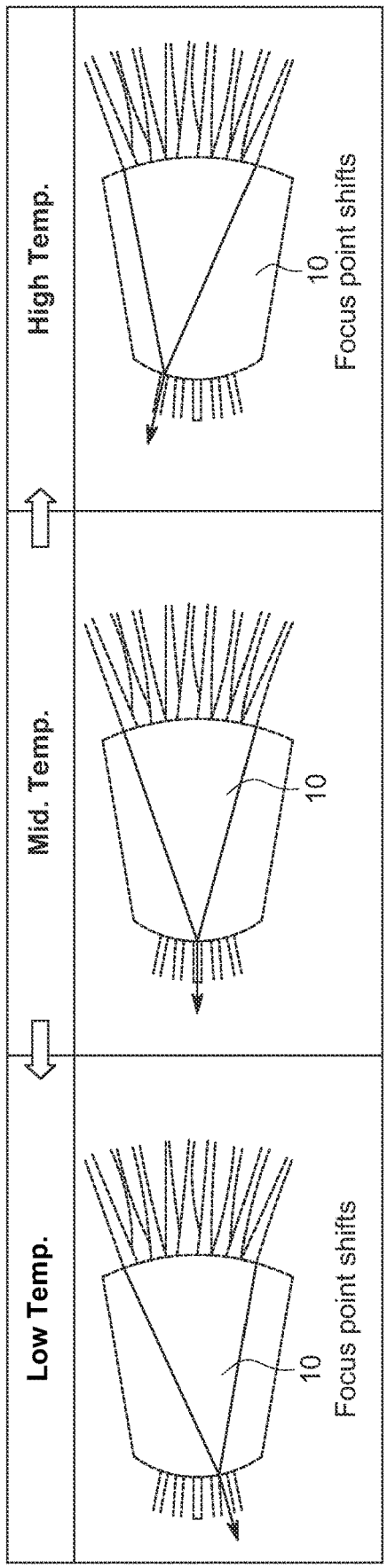
FIG. 1A (PRIOR ART)
FIG. 1B (PRIOR ART)
FIG. 1C (PRIOR ART)
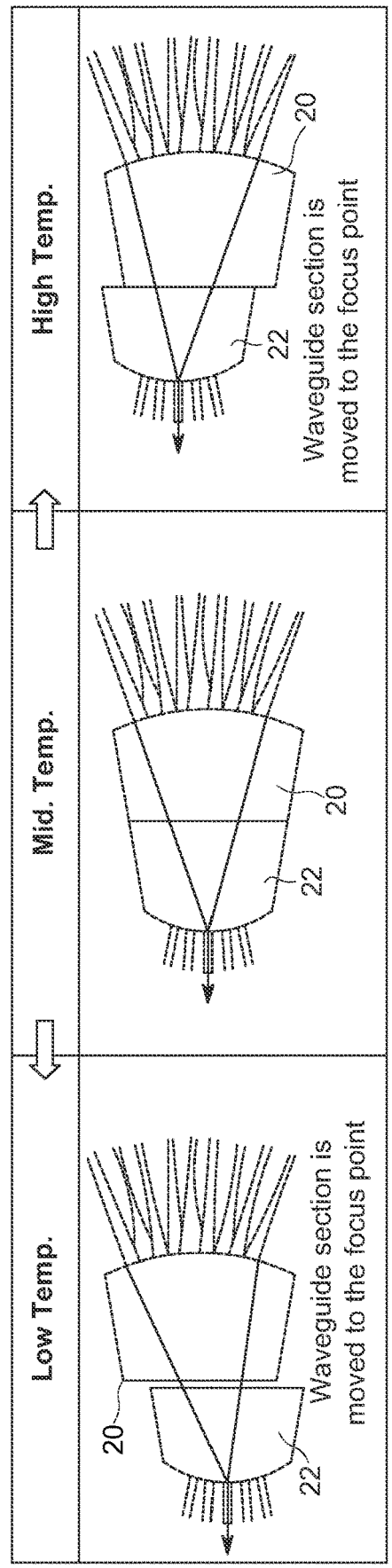
FIG. 2A (PRIOR ART)
FIG. 2B (PRIOR ART)
FIG. 2C (PRIOR ART)

VARIABLE DUAL-DIRECTIONAL THERMAL COMPENSATOR FOR ARRAYED WAVEGUIDE GRATING (AWG) MODULES

RELATED APPLICATION

This application is a National Phase of International Application No. PCT/US2019/019921 filed on Feb. 28, 2019, the contents of which are incorporated herein by reference in its entirety.

FIELD OF THE INVENTION

The present invention relates to thermal compensators, and more particularly to a new and improved thermal compensator which can be utilized in conjunction with arrayed waveguide grating (AWG) modules which are, in turn, utilized in conjunction with wavelength multiplexing and de-multiplexing within optical networks.

BACKGROUND OF THE INVENTION

In connection with arrayed waveguide grating (AWG) modules which are utilized in conjunction with wavelength multiplexing and de-multiplexing within optical networks, it has been found that as the temperature varies, the working wavelength also varies, thereby affecting performance. There are currently two types of arrayed waveguide grating (AWG) modules—the first type of arrayed waveguide grating (AWG) module is a known as a thermal arrayed waveguide grating (AWG) module wherein a heater and a thermocouple are utilized in order to maintain the temperature of the module constant. This clearly improves the wavelength stability, however, the unit consumes power, and with additional components introduced into the system, the reliability of the overall system is somewhat reduced. The second type of arrayed waveguide grating (AWG) module is a non-heated or athermal arrayed waveguide grating (AAWG) module. One advantage of an athermal arrayed waveguide grating (AAWG) module is that it is effectively a passive structure in that the power consumption is zero. One significant drawback, however, is that a non-heated or athermal arrayed waveguide grating (AAWG) module is only reliably operative within a fairly well-established working temperature range. Currently, for example, that temperature range extends from −15° C. to 70° C., although uses have been reported of such athermal arrayed waveguide grating (AAWG) modules being utilized within a temperature range of −40° C. to 85° C. However, it has also been reported that a significant drawback in utilizing such athermal arrayed waveguide grating (AAWG) modules within such temperature ranges has led to greater wavelength instability which is known as wavelength offset as established by means of the International Telecommunication Union (ITU).

In an effort to compensate for such wavelength instability utilizing athermal arrayed waveguide grating (AAWG) modules, various non-heating thermal compensators have been utilized. For example, with reference being made to FIGS. 1a-2c, it is seen that, as illustrated within FIGS. 1a-1c, which illustrates a conventional arrayed waveguide grating (AWG) module 10, as the temperature varies between low temperature conditions, through mid-temperature conditions, to high temperature conditions, the focal point of the conventional arrayed waveguide grating (AWG) module 10 shifts. Accordingly, as illustrated within FIGS. 2a-2c, there is illustrated a non-heated or athermal arrayed waveguide grating (AAWG) module 20 which is provided with a thermal compensator, not shown, which causes a forward section 22 of the non-heated or athermal waveguide grating (AAWG) module 20 to be physically or mechanically moved or displaced so as to effectively re-focus the focal point of the non-heated or athermal waveguide grating (AAWG) module 20 such that the resulting outputted focal point is effectively rendered constant, regardless of the temperature within which the non-heated or athermal arrayed waveguide grating (AAWG) module 20 is being utilized. It has also been known, however, that the thermally-induced wavelength changes are non-linear across the widely variable temperature range of operation, meaning that the mechanical movement or displacement compensation of, for example, the forward section 22 of the non heated or athermal arrayed waveguide grating (AAWG) module 20, is different when the non-heated or athermal arrayed waveguide grating (AAWG) module 20 is operating within a relatively cold environment rather than when the non-heated or athermal arrayed waveguide grating (AAWG) module 20 is operating within a relatively warm environment.

An example of a conventional variable two-directional thermal compensator is illustrated within FIG. 3 and is indicated by the reference character 30. More particularly, it is seen that the thermal compensator 30 comprises a frame member 32 which is adapted to be connected to or engaged with the movable or displaceable section of the non-heated or athermal arrayed waveguide grating (AAWG) module and which effectively comprises a three-dimensional solid-block having the configuration of a rectangular parallelepiped, and a screw 34 which is adapted to be connected to or engaged with the non-movable or non-displaceable section of the non-heated or athermal arrayed waveguide grating (AAWG) module. The frame member 32 and the screw 34 are fabricated from specifically predeterminedly different materials which are characterized by substantially different coefficient of thermal expansion (CTE) properties such that as the temperature of the environment within which the non-heated or athermal arrayed waveguide grating (AAWG) module is operating, the frame member 32 will expand or contract at a greater rate relative to the expansion or contraction of the screw so as to accordingly displace or move the movable or displaceable section of the non-heated or athermal arrayed waveguide grating (AAWG) module in a non-linear manner from cold to warm environments. Unfortunately, it has been found, however, that despite the fabrication of such temperature compensators from specifically selected materials exhibiting appropriately different coefficient of thermal expansion (CTE) properties, such prior art designs have not been able to in fact provide the necessary thermal compensation required for enabling the athermal arrayed waveguide grating (AAWG) modules to operate within significantly different or wider temperature ranges. This is because the desired movement or displacement of the movable section of the athermal arrayed waveguide grating (AAWG) module when the athermal arrayed waveguide grating (AAWG) module is operating within an environment characterized by relatively cool or cold temperatures, is different from the desired movement or displacement of the movable section of the athermal arrayed waveguide grating (AAWG) module when the athermal arrayed waveguide grating (AAWG) module is operating within an environment characterized by relatively warm or hot temperatures. The prior art design of a thermal compensator could not generate significant enough difference between expansion and contraction so as to meet the compensation requirement for athermal arrayed waveguide grating (AAWG) modules operating within, or going from, cool and/to warm environments.

Accordingly, a need therefore exists in the art for a new and improved athermal arrayed waveguide grating (AAWG) module wherein improved thermal compensation can in fact be achieved such that the athermal arrayed waveguide grating (AAWG) module can in fact be utilized within temperature ranges or environments which may exhibit significantly different or disparate temperatures. In other words, the athermal arrayed waveguide grating (AAWG) module can in fact be utilized within temperature ranges or environments which may exhibit significantly different or disparate temperatures as a result of the use of a thermal compensator which permits the athermal arrayed waveguide grating (AAWG) module to expand at a rate which is greater, when the athermal arrayed waveguide grating (AAWG) module is operating within relatively warm or hot temperature environments, than the rate at which the athermal arrayed waveguide grating (AAWG) module will contract when the athermal arrayed waveguide grating (AAWG) module is operating within relatively cool or cold temperature environments.

SUMMARY OF THE INVENTION

The foregoing needs have been achieved by means of the present invention wherein, in accordance with the principles and teachings of the present invention, a new and improved thermal compensator has been developed and is seen to comprise, in its basic form, a frame member which has the configuration of an expansible and contractible bow, in lieu of the conventional solid block rectangular parallelepiped. A central bar member is disposed internally within the bow frame member with one end of the central bar member fixedly secured to one internal end of the bow frame member, while a second opposite end of the central bar member is engaged with a screw fixedly mounted within a second opposite end of the bow frame member. The bow frame member and the central bar member are fabricated from specifically predeterminedly different materials that have different coefficient of thermal expansion (CTE) properties. In this manner, the bow frame member is capable of expanding at a substantially greater rate than the central bar member will expand under elevated temperature conditions, however, conversely, the bow frame member is effectively constrained by the central bar member so as to only be capable of contracting at the rate that the central bar member contracts under relatively low temperature conditions. This is precisely the type of thermal compensation that is desired because, as has been noted, the movable section of the athermal arrayed waveguide grating (AAWG) module, to which the thermal compensator is adapted to be connected, needs to contract at a different rate than that at which it expands so as to maintain the proper focal point of the athermal arrayed waveguide grating (AAWG) module. It is also noted that in order to achieve precise movements or displacements of the movable or displaceable section of the athermal arrayed waveguide grating (AAWG) module in order to maintain the proper focal point of the athermal arrayed waveguide grating (AAWG) module, the bow frame member of the thermal compensator may have various different geometrical configurations or shapes, the bow frame member of the thermal compensator may be fabricated from various different materials, wherein such various different materials all exhibit different coefficient of thermal expansion properties, and the size or thickness dimensions of various sections of the bow frame member may be varied.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1a is a schematic view of a conventional PRIOR ART arrayed waveguide grating (AWG) module wherein the focal point of the arrayed waveguide grating (AWG) module is schematically illustrated as having shifted in a first particular direction as a result of the arrayed waveguide grating (AWG) module being utilized within a relatively low temperature range environment;

FIG. 1b is a schematic view of the conventional PRIOR ART arrayed waveguide grating (AWG) module as disclosed within FIG. 1a wherein the focal point of the arrayed waveguide grating (AWG) module is schematically illustrated as not having shifted at all from its desired predetermined focal point as a result of the arrayed waveguide grating (AWG) module being utilized within a mid-temperature range environment;

FIG. 1c is a schematic view of the conventional PRIOR ART arrayed waveguide grating (AWG) module as disclosed within FIG. 1b wherein the focal point of the arrayed waveguide grating (AWG) module is schematically illustrated as having shifted in a second opposite direction as a result of the arrayed waveguide grating (AWG) module being utilized within a relatively high temperature range environment;

FIG. 2a is a schematic view of a conventional PRIOR ART athermal arrayed waveguide grating (AAWG) module wherein the focal point of the athermal arrayed waveguide grating (AAWG) module is schematically illustrated as being maintained constant as a result of a front portion of the athermal arrayed waveguide grating (AAWG) module being moved or displaced a predetermined distance in a first direction, by means of a thermal compensator, so as to effectively compensate for the shift in the focal point of the athermal arrayed waveguide grating (AAWG) module that would normally have occurred due to the fact that the athermal arrayed waveguide grating (AAWG) module is being utilized within a relatively low temperature range environment;

FIG. 2b is a schematic view of the conventional PRIOR ART athermal arrayed waveguide grating (AAWG) module as disclosed within FIG. 2a wherein the focal point of the athermal arrayed waveguide grating (AAWG) module is schematically illustrated as being maintained constant without the need for moving the front portion of the athermal arrayed waveguide grating (AAWG) module due to the fact that the athermal arrayed waveguide grating (AAWG) module is being utilized within a mid-temperature range environment;

FIG. 2c is a schematic view of the conventional PRIOR ART athermal arrayed waveguide grating (AAWG) module as illustrated within FIG. 2a wherein the focal point of the athermal arrayed waveguide grating (AAWG) module is schematically illustrated as being maintained constant as a result of the front portion of the athermal arrayed waveguide grating (AAWG) module being moved or displaced, by means of a thermal compensator, a predetermined distance in the opposite direction so as to effectively compensate for the shift in the focal point of the athermal arrayed waveguide grating (AAWG) module that would normally have occurred due to the fact that the athermal arrayed waveguide grating (AAWG) module is being utilized within a relatively high temperature range environment;

FIG. 6a is seen to have a substantially diamond-shaped configuration;

DETAILED DESCRIPTION OF THE ILLUSTRATED EMBODIMENTS

Figure 4:
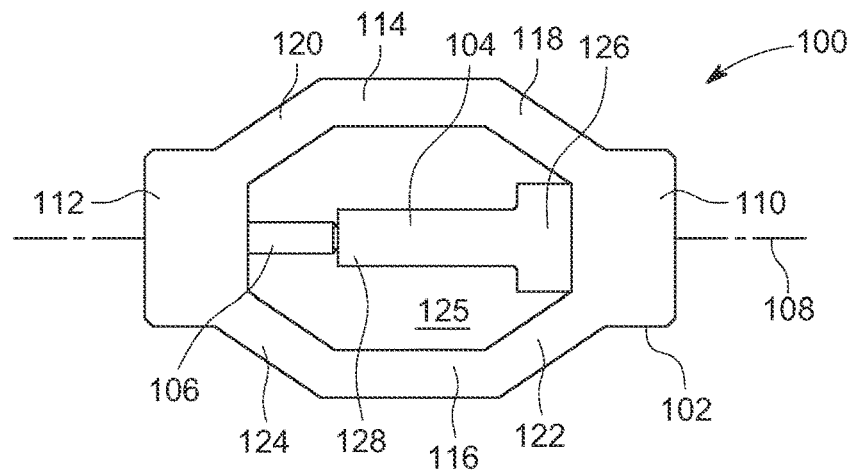
FIG. 4 is a schematic view of a first embodiment of a new and improved variable dual-directional thermal compensator which has been developed in accordance with the principles and teachings of the present invention so as to be advantageously utilized in conjunction with athermal arrayed waveguide grating (AAWG) modules.

With reference now being made to the drawings, and more particularly to FIG. 4 thereof, a first embodiment of the new and improved variable dual-directional thermal compensator for use in conjunction with athermal arrayed waveguide grating (AAWG) modules is disclosed and is generally indicated by the reference character 100. More particularly, it is seen that the new and improved variable dual-directional thermal compensator 100 comprises a frame member 102, a central bar member 104, and a screw 106. Still more particularly, it is seen that the frame member 102 has a geometrical configuration which is substantially that of a bow comprising an axially elongated octagon as defined with respect to, or about, a longitudinally oriented axis 108. More specifically, the bow-shaped frame member 102 is seen to comprise a first end section 110 which is adapted to be movable, a second oppositely disposed end section 112 which is adapted to be fixed, a first side section 114, a second side section 116, first and second leg sections 118, 120 respectively interconnecting the first side section 114 to the first and second end sections 110, 112, and third and fourth leg sections 122, 124 respectively interconnecting the second side section 116 to the first and second end sections 110, 112, wherein all of the aforenoted sections and leg portions of the bow-shaped frame member 102 define a central hollow portion 125.

As can therefore be appreciated, due to the unique geometrical structural configuration of the bow-shaped frame member 102, as temperatures become elevated, the bow-shaped frame member 102 will effectively elongate or expand axially, with respect to longitudinally extending axis 108, as permitted by means of the structural interconnections defined between the first side section 114, the second side section 116, the first and second leg sections 118, 120 respectively interconnecting the first side section 114 to the first and second end sections 110, 112, and the third and fourth leg sections 122, 124 respectively interconnecting the second side section 116 to the first and second end sections 110, 112. It will be further appreciated that as the bow-shaped frame member 102 effectively elongates or expands axially, the first and second side sections 114, 116 will effectively move toward each other, again, as permitted by means of the first and second leg sections 118, 120 respectively interconnecting the first side section 114 to the first and second end sections 110, 112, and the third and fourth leg sections 122, 124 respectively interconnecting the second side section 116 to the first and second end sections 110, 112. It will be further appreciated that when the athermal arrayed waveguide grating (AAWG) module, with which the thermal compensator 100 is to be utilized, is subjected to, or operating within, relatively cool or cold temperatures, the reverse movement or displacement of the bow-shaped frame member 102 occurs, that is, the bow-shaped frame member 102 will axially contract. It is therefore seen that the structural configuration characterizing the bow-shaped frame member 102 provides the bow-shaped frame member 102 with unique flexibility and resiliency so as to precisely perform needed movements or displacements of a movable section of an athermal arrayed waveguide grating (AAWG) module, as will be discussed more fully hereinafter.

As can also be seen from FIG. 4, the central bar member 104 is disposed within a hollow central portion 125 of the bow-shaped frame member 102 and has a substantially T-shaped configuration which is seen to comprise a first end or head portion 126 that is fixedly secured to the first end section 110 of the bow-shaped frame member 102, while a second opposite end or foot portion 128 is adapted to be engaged with a first end portion of the screw 106 which has its oppositely disposed second end portion fixedly mounted within the second end section 112 of the bow-shaped frame member 102. The screw 106 is threadedly adjusted within the fixed end section 112 of the bow-shaped frame member 102 so as to position the first end or head portion 126 into engagement with the internal surface portion of the first end section 110 of the bow-shaped frame member 102. In accordance with further teachings and principles of the present invention, the bow-shaped frame member 102 and the central bar member 104 are fabricated from materials having specific, different, predetermined or known coefficient of thermal expansion (CTE) properties with the bow-shaped frame member 102 being fabricated from a material which exhibits a greater or higher coefficient of thermal expansion (CTE) than that of the central bar member 104. In this manner, it can therefore be appreciated that when the athermal arrayed waveguide grating (AAWG) module is being operated within an environment which is experiencing relatively warm or hot temperature conditions, the bow-shaped frame member 102 will effectively be free to expand or elongate axially in accordance with its coefficient of thermal expansion (CTE) properties, whereas, conversely, when the athermal arrayed waveguide grating (AAWG) module is being operated within an environment which is experiencing relatively cool or cold temperature conditions, the bow-shaped frame member 102 will effectively be somewhat constrained or retarded in its axial contraction movements or displacements in view of the fact that the first end section 110 of the bow-shaped frame member 102 is fixedly secured to the central bar member 104, and since the coefficient of thermal expansion (CTE) properties of the central bar member 104 are less than that of the bow-shaped frame ember 102, the axial contraction of the central bar member 104 proceeds at a smaller or slower rate as compared to the axial contraction of the bow-shaped frame member 102, whereby the overall contraction of the bow-shaped frame member 102 is achieved at a lower rate than its axial thermal expansion or elongation. As has been noted hereinbefore, these movements or displacements are desired and required in order to preserve the proper focal point of the athermal arrayed waveguide grating (AAWG) module.

It is to be additionally noted that when the athermal arrayed waveguide grating (AAWG) module is operatively disposed within or exposed to relatively warm or hot temperature conditions, the bow-shaped frame member 102 will axially expand or elongate to such an extent that the second opposite end or foot portion 128 of the central bar member 104 will disengage from the first end portion of the screw 106, however, and conversely, when the athermal arrayed waveguide grating (AAWG) module is operatively disposed within or exposed to relatively cool or cold temperature conditions, the bow-shaped frame member 102 will axially contract, as permitted by the central bar member 104 in accordance with the differential between their coefficients of thermal expansion (CTE), such that the second opposite end or foot portion 128 of the central bar member 104 will again engage from the first end portion of the screw 106. It is to be noted still further that the screw 106 is usually fabricated from a material which is characterized by means of a relatively large Young's Modulus and a small coefficient of thermal expansion (CTE). Accordingly, it has been found that when the second opposite end or foot portion 128 of the central bar member 104 engages the first end portion of the screw 106, the relative hardness or stiffness of the screw 106 may possibly cause indentations or other damage to the second opposite end or foot portion 128 of the central bar member 104. In order to prevent this condition from occurring, the second opposite end or foot portion 128 of the central bar member 104 may be provided with a protection block 130 as is illustrated within FIG. 5. The protection block 130 is fabricated from the same material that is utilized to fabricate the screw 106 whereby, accordingly, the Young's modulus and hardness or stiffness of the protection block 130 is the same as that of the screw 106 such that the first end portion of the screw 106 cannot in fact damage the central bar member 104.

Figures 5, 5A:
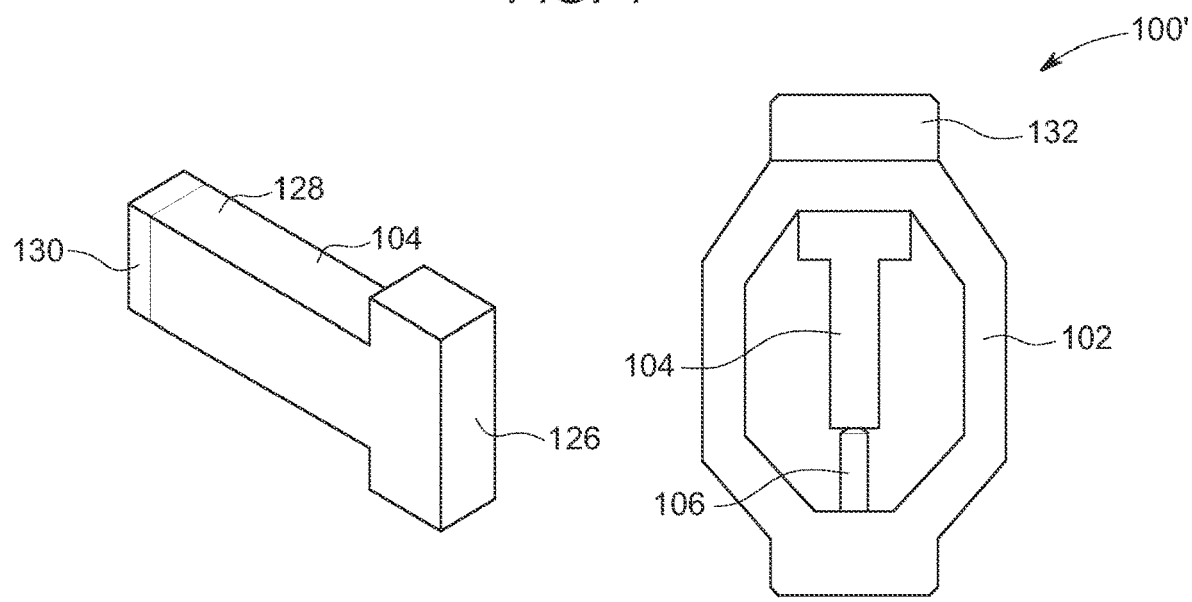
FIG. 5 is a schematic view of a second embodiment of the central bar member of the new and improved variable dual-directional thermal compensator of the present invention wherein a protection block has been attached to the end of the central bar member which is adapted to be engaged with the screw so as to protect the central bar member from being damaged by the screw which is fabricated from a material that has a hardness parameter greater than that of the central bar member.
FIG. 5a is a schematic view, similar to that of FIG. 4, wherein, however, the bow-shaped frame member of the thermal compensator has been provided with an expansion-enhancement block which is attached to an external surface portion of the head end of the bow-shaped frame member.

With reference now being made to FIG. 5a, it has also been noted that the expansion of the bow-shaped frame member 102, and the movement or displacement of that section of the athermal arrayed waveguide grating (AAWG) module to which the thermal compensator is attached, as will be discussed more fully hereinafter, can be further enhanced by attaching an expansion-enhancement block to the external surface portion of the head end of the bow-shaped frame member. As technology trends toward smaller components such that the smaller components can be accommodated within spatial environments where available space is a critical design factor, the effective size of the thermal compensator needs to be smaller in connection with, for example, its overall longitudinal length dimension. This can be accomplished by shortening the longitudinal length of the bow-shaped frame member and/or the central bar member. However, with such shorter structural components, the thermal compensator may not necessarily achieve the desired relative movements or displacements under hot and cold temperature conditions. Accordingly, as illustrated within FIG. 5a, an expansion-enhancement block 132 has been attached to an external surface portion of the head end of the bow-shaped frame member 102 of the thermal compensator 100'. The expansion-enhancement block 132 may be fabricated from a suitable material which has a larger coefficient of thermal expansion (CTE) than that of the bow-shaped frame member 102 whereby the expansion-enhancement block 132 will accordingly expand at a faster rate, and to a greater extent, than the bow-shaped frame member 102. Conversely, however, during operation within relatively cool or cold temperature environments, the contraction of the expansion-enhancement block 132, as well as that of the bow-shaped frame member 102, will again be somewhat retarded by the relatively lower coefficient of thermal expansion (CTE) properties characteristic of the central bar member 104.

Figure 6A:
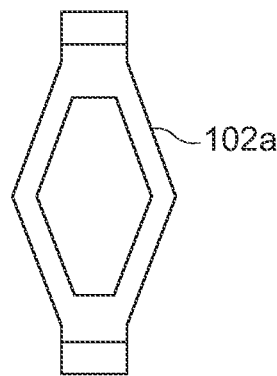
FIG. 6a is a schematic view of a second embodiment of a bow-shaped frame member which has been developed in accordance with the teachings and principles of the present invention, and wherein, in lieu of the substantially axially elongated hexagonally configured bow-shaped frame member 102 as disclosed within FIG. 4, the bow-shaped frame member as disclosed within
Figure 6B:
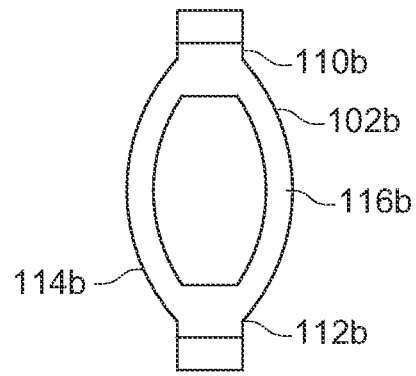
FIG. 6b is a schematic view of a third embodiment of a bow-shaped frame member wherein, in lieu of the linear sides and legs characterized by the bow-shaped frame member as disclosed within FIG. 4, the first and second end sections of the bow-shaped frame member 102b are interconnected together by means of arcuately configured side sections.
Figure 6C:
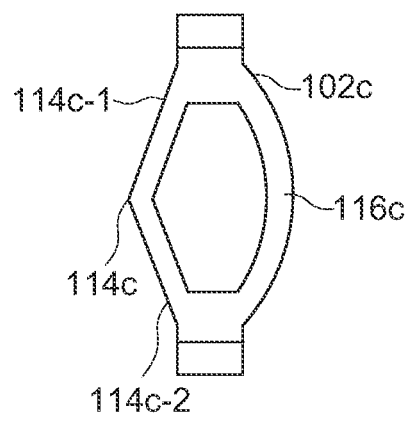
FIG. 6c is a schematic view of a fourth embodiment of a bow-shaped frame member wherein one of the arcuately configured side sections of the bow-shaped frame member, as disclosed within FIG. 6b, has been replaced by means of a side section that comprises a pair of linear segments wherein it will be appreciated that, unlike the bow-shaped frame members of the previous embodiments, the two side sections of this fourth embodiment of the bow-shaped frame member are no longer symmetrical or mirror-images of each other in structure whereby, as the bow-shaped frame member axially expands and contracts, the two side sections will experience different expansion and contraction movements or displacements such that the expansion or contraction of the overall bow-shaped frame member will no longer be rectilinear but will also encompass or comprise a predetermined angular movement or displacement.

Continuing further, and with reference being made to FIGS. 6a-6h, various different embodiments of the bow-shaped frame member 102, having various different structural configurations, are possible in order to achieve additional, different expansion and contraction movements or displacements of the athermal arrayed waveguide grating (AAWG) module when the the new and improved variable dual-directional thermal compensator 100 is operatively connected to an athermal arrayed waveguide grating (AAWG) module as will be discussed further hereinafter. For example, as disclosed within FIG. 6a, which illustrates a second embodiment of a bow-shaped frame member which has been developed in accordance with the teachings and principles of the present invention, in lieu of the substantially axially elongated hexagonally configured bow-shaped frame member 102 as disclosed within FIG. 4, the bow-shaped frame member 102a as disclosed within FIG. 6a is seen to have a substantially diamond-shaped configuration. Alternatively, as disclosed within FIG. 6b, a third embodiment of a bow-shaped frame member is illustrated wherein, in lieu of the linear sides and legs characterized by the bow-shaped frame member 102 as disclosed within FIG. 4, the first and second end sections 110b, 112b of the bow-shaped frame member 102b are interconnected together by means of arcuately configured side sections 114b, 116b. Still further, as can be seen from FIG. 6c, a fourth embodiment of a bow-shaped frame member is disclosed wherein one of the arcuately configured side sections 114b of the bow-shaped frame member 102b has been replaced by means of a side section that comprises a pair of linear segments 114c-1, 114c-2. It will be appreciated that, unlike the bow-shaped frame members 102, 102a, and 102b, the two side sections 114c, 116c are no longer symmetrical or mirror-images of each other in structure. Therefore, as the bow-shaped frame member 102c axially expands and contracts, the two side sections 114c, 116c will experience different expansion and contraction movements or displacements. In this manner, the expansion or contraction of the overall bow-shaped frame member 102c will no longer be rectilinear but will also encompass or comprise a predetermined angular movement or displacement.

Figure 6D:
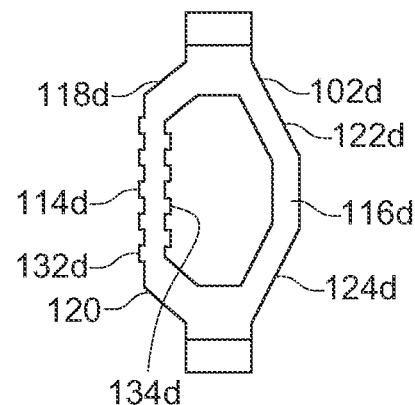
FIG. 6d is a schematic view of a fifth embodiment of a bow-shaped frame member wherein it is seen that the right side section of the bow-shaped frame member, comprising the three lineal segments, is substantially similar to the side section of the bow-shaped frame member illustrated within FIG. 4 and comprising segments, however, the left side section, which interconnects two of the lineal segments together, is seen to comprise a linear segment which is provided with different thickness portions which protrude transversely outwardly and inwardly with respect to the lineal extent of the left side section such that, again, it is to be appreciated that in view of the asymmetrical structure defined between the left and right sides of the bow-shaped frame member, the expansion or contraction of the overall bow-shaped frame member will no longer be rectilinear but will also encompass or comprise a predetermined angular movement or displacement.

Continuing still further, and with reference being made to FIG. 6d, a fifth embodiment of a bow-shaped frame member 102d is disclosed wherein it is appreciated that the right side section of the bow-shaped frame member 102d, comprising the segments 116d, 122d, 124d, is substantially similar to the side section of the bow-shaped frame member 102 illustrated within FIG. 4 and comprising segments 116, 122, 124, however, the left side section 114d, which interconnects the segments 118d, 120d together, is seen to comprise a linear segment which is provided with different thickness portions 132d, 134d which protrude transversely outwardly and inwardly with respect to the lineal extent of the left side section 114d. It is again to be appreciated that in view of the asymmetrical structure defined between the left and right sides of the bow-shaped frame member 102d, the expansion or contraction of the overall bow-shaped frame member 102c will no longer be rectilinear but will also encompass or comprise a predetermined angular movement or displacement.

Figure 6E:
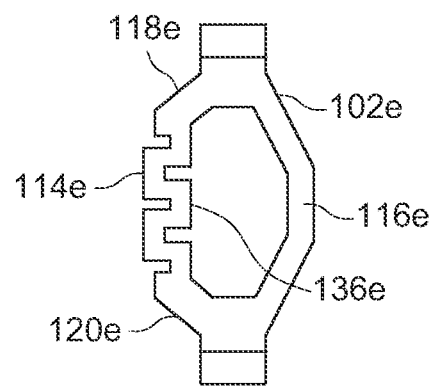
FIG. 6e is a schematic view of a sixth embodiment of a bow-shaped frame member wherein a right side section is similar to the right side section of the fifth embodiment bow-shaped frame member as illustrated within FIG. 6d, however, it is seen that the left side section of the bow-shaped frame member comprises a plurality of sections which are interconnected together in a pleated or sinusoidal manner such that when the overall bow-shaped frame member experiences expansion or contraction, the individual pleated or sinusoidally-shaped sections will expand or contract with respect to each other whereby, again, the expansion or contraction of the overall bow-shaped frame member will no longer be rectilinear but will also encompass or comprise a predetermined angular movement or displacement.
Figure 6F:
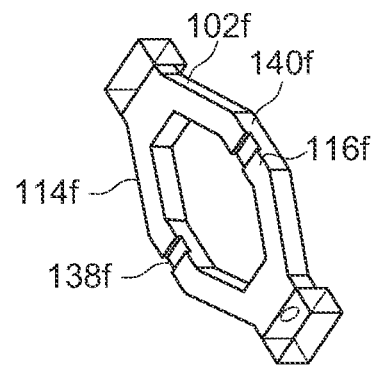
FIG. 6f is a schematic view of a seventh embodiment of a bow-shaped frame member wherein it is seen that the structure of this seventh embodiment bow-shaped frame member is substantially similar to the first embodiment bow-shaped frame member except for the fact that portions of the side sections have been removed so as to vary the thickness dimensions of such side sections whereby such variations in the thickness dimensions of the side sections of the bow-shaped frame member will affect the expansion and contraction characteristics of the bow-shaped frame member.
Figure 6G:
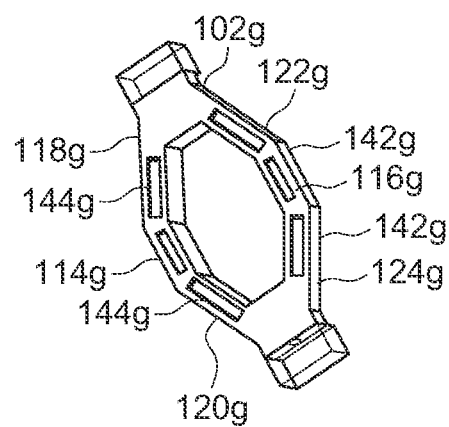
FIG. 6g is a schematic view of an eighth embodiment of a bow-shaped frame member wherein it is seen that the eighth embodiment bow-shaped frame member is substantially similar to the first embodiment bow-shaped frame member except for the fact that slots have been respectively defined within the side segments of the bow-shaped frame member whereby the slots effectively define variations in the thickness dimensions or mass of the side sections of the bow-shaped frame member that will affect the expansion and contraction characteristics of the bow-shaped frame member.

With reference being made to FIG. 6e, a sixth embodiment of a bow-shaped frame member 102e, which may be developed in accordance with the principles and teachings of the present invention, is disclosed and is seen to comprise a right side section 116e which is similar to the right side section 116d of the fifth embodiment bow-shaped frame member 102d, however, it is seen that the left side section 114e of the bow-shaped frame member 102e, which interconnects the segments 118e, 120e together, comprises a plurality of sections 136e which are interconnected together in a pleated or sinusoidal manner. It can therefore be appreciated that when the overall bow-shaped frame member 102e experiences expansion or contraction, the individual sections 136e will also expand or contract with respect to each other such that, again, the expansion or contraction of the overall bow-shaped frame member 102c will no longer be rectilinear but will also encompass or comprise a predetermined angular movement or displacement. With reference next being made to FIG. 6f, a seventh embodiment of a bow-shaped frame member 102f is disclosed wherein it is seen that the structure of this seventh embodiment bow-shaped frame member 102f is substantially similar to the first embodiment bow-shaped frame member 102 except for the fact that portions of the side sections 114f, 116f have been removed, as indicated by the reference characters 138f, 140f, so as to vary the thickness dimensions of such side sections 114f, 116f. These variations in the thickness dimensions of the side sections 114f, 116f will affect the expansion and contraction characteristics of the bow-shaped frame member 102f. An eighth embodiment of a bow-shaped frame member 102g is illustrated within FIG. 6g wherein it is seen that the eighth embodiment bow-shaped frame member 102g is substantially similar to the first embodiment bow-shaped frame member 102 except for the fact that slots 142g, 144g have been respectively defined within the side segments 116g, 122g, 124g, and 114g, 118g, 120g. Again, these variations in the thickness dimensions or mass of the side sections of the bow-shaped frame member 102g will affect the expansion and contraction characteristics of the bow-shaped frame member 102g. Lastly, with reference being made to FIG. 6h, a ninth embodiment of a bow-shaped frame member 102h is disclosed wherein it is seen that bow-shaped frame member 102h has a configuration similar to that of the bow-shaped frame member 102, as disclosed within FIG. 4, except for the fact that a substantially rectangularly configured chamber 146h is defined interiorly of the bow-shaped frame member 102h so as to accommodate the head portion 126 of the central bar member 104. In this manner, the central bar member 104 need not actually be fixedly secured to the bow-shaped frame member 102h so as to effectively define a one-piece structure with the bow-shaped frame member, but nevertheless, the central bar member 104 will effectively be locked in place internally within the bow-shaped frame member 102h as a result of the disposition of its head portion 126 within the chamber 146h.

Figure 7A:
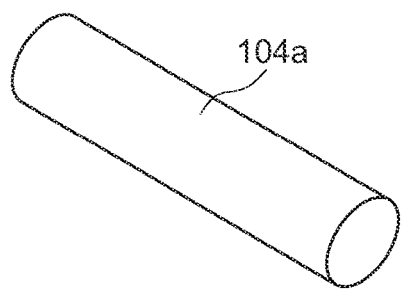
FIG. 7a is a schematic view of a second embodiment of the central bar member, wherein, in lieu of having the substantially T-shaped configuration of the central bar member 104 as illustrated within FIG. 4, the second embodiment of the central bar member may comprise a cylindrically configured central bar member.
Figure 7B:
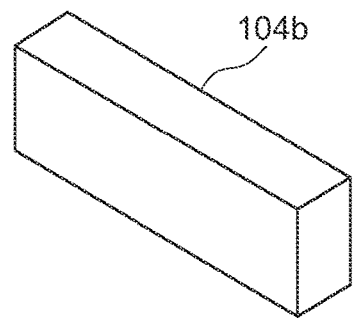
FIG. 7b is a schematic view of a third embodiment of the central bar member wherein it is seen that the third embodiment of the central bar member has a geometrical configuration which is that of a rectangular parallelepiped.
Figure 7C:
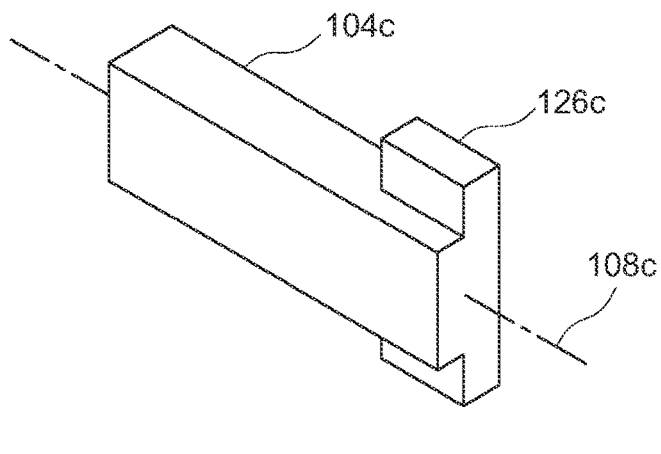
FIG. 7c is a schematic view of a fourth embodiment of the central bar member wherein it is seen that the fourth embodiment of the central bar member is similar to the first embodiment of the central bar member as illustrated within FIG. 4, however, it is seen that the lateral width or transverse dimension of the head portion of the central bar member, as considered with respect to the longitudinal axis of the central bar member, is only approximately one half that of the head portion of the central bar member as illustrated within FIG. 4.

As was the case with the bow-shaped frame member 102, various different embodiments of the central bar member 104, having various different structural configurations, are possible in order to achieve additional, different expansion and contraction movements or displacements of the athermal arrayed waveguide grating (AAWG) module when the new and improved variable dual-directional thermal compensator 100 is operatively connected to an athermal arrayed waveguide grating (AAWG) module, as will be discussed further hereinafter, and when the athermal arrayed waveguide grating (AAWG) module is being operated within relatively warm, hot, cool, or cold temperature conditions. These various embodiments are disclosed within FIGS. 7a-7f. Accordingly, with reference being made to FIG. 7a, it is seen that a second embodiment of the central bar member 104a, in lieu of having the substantially T-shaped configuration of the central bar member 104 as illustrated within FIG. 4, the central bar member 104 may comprise a cylindrically configured central bar member. Alternatively, as illustrated within FIG. 7b, a third embodiment of the central bar member is illustrated at 104b and is seen to have a geometrical configuration which is that of a rectangular parallelepiped. With reference being made to FIG. 7c, a fourth embodiment of the central bar member is illustrated at 104c and it is seen that the fourth embodiment of the central bar member 104 is similar to the first embodiment of the central bar member 104 as illustrated within FIG. 4, however, it is seen that the lateral width or transverse dimension of the head portion 126c, as considered with respect to the longitudinal axis 108c of the central bar member 104c, is only approximately one half that of the head portion 126 of the central bar member 104 as illustrated within FIG. 4.

Figure 6H:
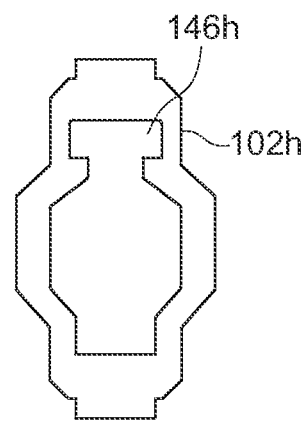
FIG. 6h is a schematic view of a ninth embodiment of a bow-shaped frame member wherein it is seen that bow-shaped frame member has a configuration similar to that of the first embodiment bow-shaped frame member, as disclosed within FIG. 4, except for the fact that a substantially rectangularly configured chamber is defined interiorly of the bow-shaped frame member so as to accommodate the head portion of the central bar member whereby the central bar member need not actually be fixedly secured to the bow-shaped frame member so as to effectively define a one-piece structure with the bow-shaped frame member, but nevertheless, the central bar member will effectively be locked in place internally within the bow-shaped frame member as a result of the disposition of its head portion within the bow-shaped frame member chamber.
Figure 7D:
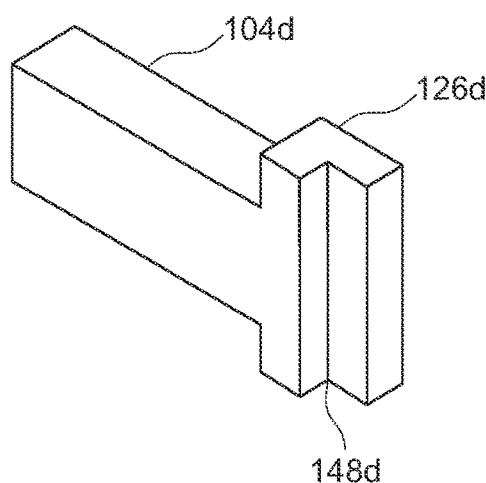
FIG. 7d is a schematic view of a fifth embodiment of the central bar member wherein it is seen that the fifth embodiment of the central bar member is similar to the first embodiment of the central bar member as illustrated within FIG. 4, however, it is seen that in lieu of the complete head portion of the central bar member, as illustrated within FIG. 4, the head portion of the fifth embodiment of the central bar member 104d effectively has one corner or quadrant removed from the rectangular parallelepiped which formed the head portion of the central bar member 126 as illustrated within FIG. 4.
Figure 7E:
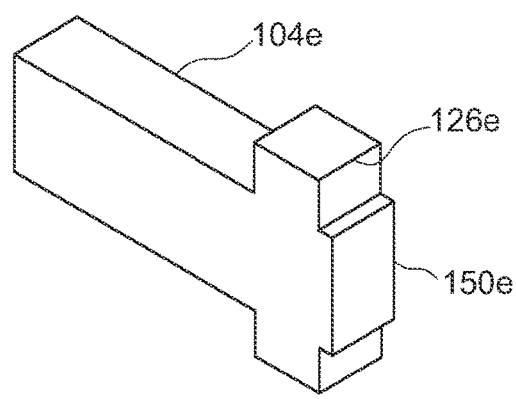
FIG. 7e is a schematic view of a sixth embodiment of the central bar member wherein it is seen that the central bar member has a configuration which is similar to that of the central bar member 104 as illustrated within FIG. 4 except for the fact that the distal end portion 136e of the central bar member 104e projects a predetermined amount beyond the disposition of the head portion 126e of the central bar member 104e.

Still further, with reference being made to FIG. 7d, a fifth embodiment of the central bar member is illustrated at 104d and it is seen that the fifth embodiment of the central bar member 104 is similar to the first embodiment of the central bar member 104 as illustrated within FIG. 4, however, it is seen that in lieu of the complete head portion 126 of the central bar member 104 as illustrated within FIG. 4 and as comprising a rectangular parallelepiped, the head portion 126d of the fifth embodiment of the central bar member 104d effectively has one corner or quadrant removed, as at 148d, from the rectangular parallelepiped forming the head portion 126 of the central bar member 126 as illustrated within FIG. 4. With reference lastly being made to FIG. 7e, a sixth embodiment of the central bar member is illustrated at 104e and is seen to have a configuration which is similar to that of the central bar member 104 as illustrated within FIG. 4 except for the fact that the distal end portion 150e of the central bar member 104e projects a predetermined amount beyond the disposition of the head portion 126e of the central bar member 104e, as considered with respect to the longitudinal axis 151 of the T-shaped central bar member 104e. It is to be noted that, in a manner similar to providing the differently configured bow-shaped frame members 102-102h as illustrated within FIGS. 4 and 6a-6h, the differently configured central bar members 104 and 104-a-104e, as illustrated within FIGS. 4 and 7a-7h, will provide the central bar members with different thickness dimensions, different mass quantities, and the like, whereby such differences will manifest themselves as different factors affecting the expansion and contraction properties of the central bar member.

Figure 8A:
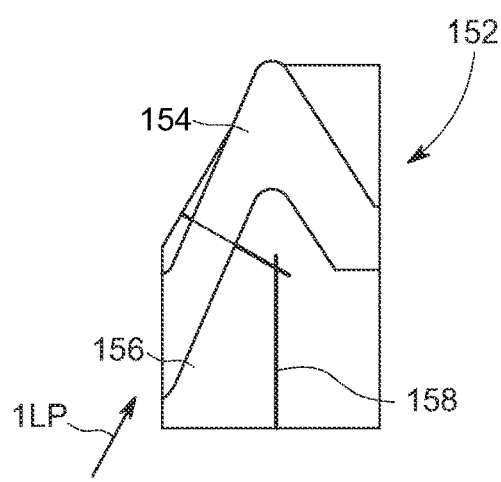
FIG. 8a is a schematic view of a first embodiment of an athermal arrayed waveguide grating (AAWG) module wherein it is seen that the athermal arrayed waveguide grating (AAWG) module is effectively divided into a fixed, primary section and a second movable section which comprises a fractional portion of the overall athermal arrayed waveguide grating (AAWG) module.

Having described the various structural components of the thermal compensator of the present invention, and the various different configurations or alternative embodiments thereof, the operation of the thermal compensator of the present invention, when operatively connected to an athermal arrayed waveguide grating (AAWG) module, will now be described. As was briefly noted in the discussion relating to conventional arrayed waveguide grating (AWG) modules as illustrated within FIGS. 2a-2c, and with reference being made to FIG. 8a, a first embodiment of an athermal arrayed waveguide grating (AAWG) module is illustrated and is generally indicated by the reference character 152. More particularly, it is seen that the first embodiment athermal arrayed waveguide grating (AAWG) module 152 comprises two major components, a primary fixed component 154 and a secondary movable component 156, wherein the secondary movable component 156 is effectively a fractional section of the overall athermal arrayed waveguide grating (AAWG) module 152. The boundary between the primary fixed component 154 and the secondary movable component 156 is illustrated at 158. As can be appreciated, the movable component 156 is adapted to be moved or displaced as required to maintain the proper focal point of the athermal arrayed waveguide grating (AAWG) module 152 when the athermal arrayed waveguide grating (AAWG) module 152 is being operated under variously different, relatively warm, hot, cool, or cold temperature conditions. Alternatively, as illustrated within FIG. 8b, a second embodiment of athermal arrayed waveguide grating (AAWG) module is illustrated and is generally indicated by the reference character 152'. In accordance with this second embodiment of an athermal arrayed waveguide grating (AAWG) module 152', it is seen that the athermal arrayed waveguide grating (AAWG) module 152' is effectively divided in half and comprises an upper movable section 160' and a lower fixed section 162'. In both embodiments illustrated within FIGS. 8a and 8b, it is noted that the movable and fixed sections can be reversed.

Figure 8B:
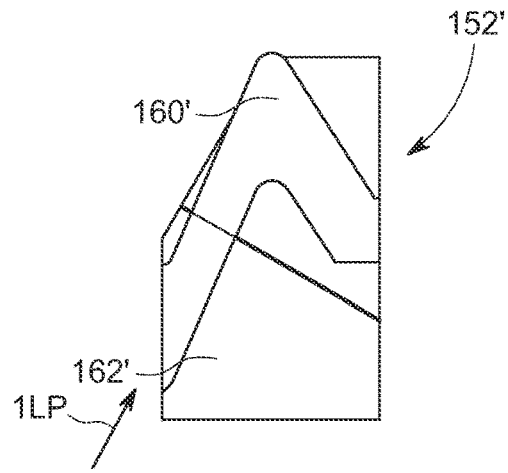
FIG. 8b is a schematic view of a second embodiment of an athermal arrayed waveguide grating (AAWG) module wherein it is seen that the athermal arrayed waveguide grating (AAWG) module is effectively divided in half such that one half section is fixed and the other half section is movable.
Figure 8C:
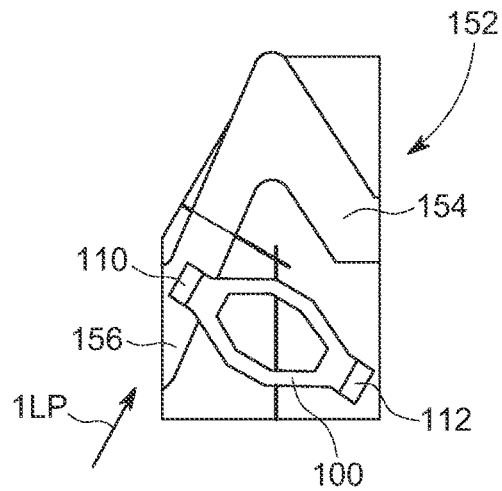
FIG. 8c is a schematic view illustrating a thermal compensator, such as that illustrated within FIG. 4, operatively connected to the first embodiment athermal arrayed waveguide grating (AAWG) module, as illustrated within FIG. 8a, in such a manner that the longitudinal axis of the thermal compensator is oriented at a first predetermined angle with respect to the incoming light path of the optical network such that when the thermal compensator undergoes expansion, the second movable component will be moved or displaced in a leftward oriented direction parallel to the longitudinal axis of the thermal compensator.
Figure 8D:
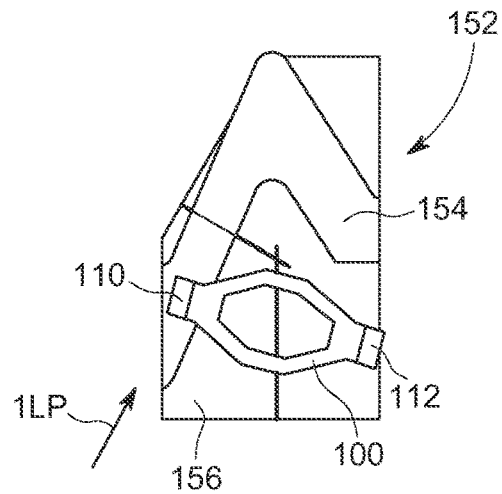
FIG. 8d is a schematic view illustrating a thermal compensator, such as that illustrated within FIG. 4, operatively connected to the first embodiment athermal arrayed waveguide grating (AAWG) module, as illustrated within FIG. 8a, in such a manner that the longitudinal axis of the thermal compensator is oriented at a second predetermined angle with respect to the incoming light path of the optical network, and different from the first predetermined angle at which the longitudinal axis of the thermal compensator is oriented as illustrated within FIG. 8c, such that when the thermal compensator undergoes expansion, the second movable component will again be moved or displaced in an angular oriented direction relative to the longitudinal axis of the thermal compensator.

As illustrated within FIG. 8c, when a thermal compensator 100, such as that illustrated within FIG. 4, is operatively connected to the first embodiment athermal arrayed waveguide grating (AAWG) module 152, as illustrated within FIG. 8c, in such a manner that the fixed end 112 of the thermal compensator 100 is fixed to the primary fixed component 154 of the thermal compensator 100 while the movable end 110 of the thermal compensator is fixed to the secondary movable component 156, and the longitudinal axis 108 of the thermal compensator 100 is oriented at a first predetermined angle with respect to the incoming light path (ILP) of the optical network, then when the thermal compensator 100 undergoes expansion, the secondary movable component 156 of the first embodiment athermal arrayed waveguide grating (AAWG) module 152 will be moved or displaced in a leftward oriented direction parallel to the longitudinal axis 108 of the thermal compensator 100. In a similar manner, when a thermal compensator 100, such as that illustrated within FIG. 4, is operatively connected to the first embodiment athermal arrayed waveguide grating (AAWG) module 152, as illustrated within FIG. 8d, in such a manner that the fixed end 112 of the thermal compensator 100 is fixed to the primary fixed component 154 of the thermal compensator 100 while the movable end 110 of the thermal compensator is fixed to the secondary movable component 156, but the longitudinal axis of the thermal compensator is oriented at a second predetermined angle with respect to the incoming light path (ILP) of the optical network, which is different from the first predetermined angle at which the longitudinal axis of the thermal compensator 100 is oriented as illustrated within FIG. 8*d*, then when the thermal compensator undergoes expansion, the second movable component will again be moved or displaced in an angular orientation with respect to the longitudinal axis of the thermal compensator.

Figure 8E:
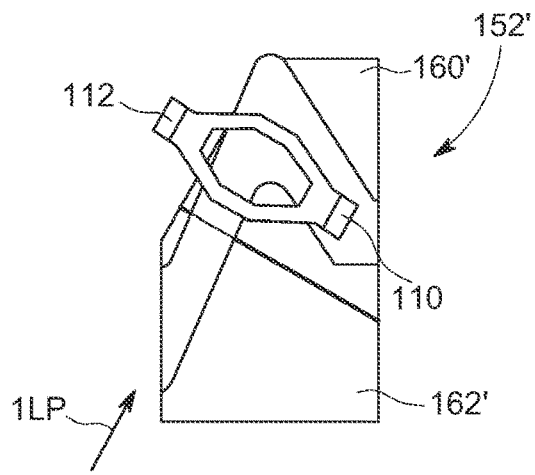
FIG. 8e is a schematic view illustrating a thermal compensator, such as that illustrated within FIG. 4, operatively connected to the second embodiment athermal arrayed waveguide grating (AAWG) module, as illustrated within FIG. 8b, in such a manner that the thermal compensator has its fixed end fixedly connected to a base or housing portion of the athermal arrayed waveguide grating (AAWG) module while the longitudinal axis of the thermal compensator is oriented at a first predetermined angle with respect to the incoming light path of the optical network such that when the thermal compensator undergoes expansion, the upper movable component of the athermal arrayed waveguide grating (AAWG) module will be moved or displaced in a substantially rightwardly oriented direction parallel to the longitudinal axis of the thermal compensator.
Figure 8F:
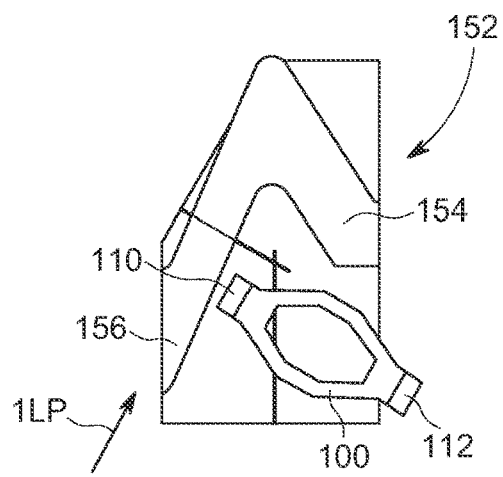
FIG. 8f is a schematic view illustrating a thermal compensator, such as that illustrated within FIG. 4, operatively connected to the first embodiment athermal arrayed waveguide grating (AAWG) module, as illustrated within FIG. 8c, wherein, however, the thermal compensator has its fixed end fixedly connected to a base or housing portion of the athermal arrayed waveguide grating (AAWG) module while the longitudinal axis of the thermal compensator is oriented at a first predetermined angle with respect to the incoming light path of the optical network such that when the thermal compensator undergoes expansion, the second movable fractional component of the athermal arrayed waveguide grating (AAWG) module will be moved or displaced in a substantially leftwardly oriented direction parallel to the longitudinal axis of the thermal compensator.

Alternatively, as illustrated within FIG. 8*e*, when a thermal compensator 100, such as that illustrated within FIG. 4, is operatively connected to the second embodiment athermal arrayed waveguide grating (AAWG) module 152', as illustrated within FIG. 8*b*, in such a manner that the thermal compensator 100 has its fixed end fixedly connected to a base or housing portion of the athermal arrayed waveguide grating (AAWG) module 152' while the longitudinal axis 108 of the thermal compensator 100 is oriented at a first predetermined angle with respect to the incoming light path (ILP) of the optical network such that when the thermal compensator 100 undergoes expansion, the upper movable component 160' of the athermal arrayed waveguide grating (AAWG) module 152' will be moved or displaced in a substantially rightwardly oriented direction parallel to the longitudinal axis 108 of the thermal compensator 100. As still another alternative, FIG. 8*f* is a schematic view illustrating a thermal compensator 100, such as that illustrated within FIG. 4, operatively connected to the first embodiment athermal arrayed waveguide grating (AAWG) module 152, as illustrated within FIG. 8*c*, wherein, however, the thermal compensator 100 has its fixed end fixedly connected to a base or housing portion of the athermal arrayed waveguide grating (AAWG) module 152 while the longitudinal axis 108 of the thermal compensator 100 is oriented at a first predetermined angle with respect to the incoming light path (ILP) of the optical network such that when the thermal compensator 100 undergoes expansion, the second movable fractional component 156 of the athermal arrayed waveguide grating (AAWG) module 152 will be moved or displaced in a substantially leftwardly oriented direction parallel to the longitudinal axis of the thermal compensator.

Figure 3:
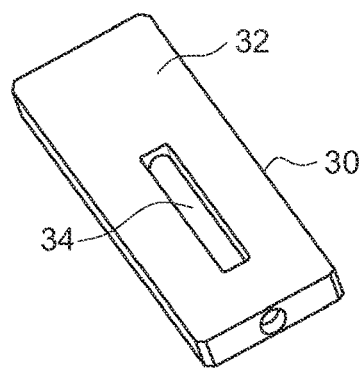
FIG. 3 is a perspective view of a conventional, PRIOR ART, thermal compensator which has been utilized in conjunction with athermal arrayed waveguide grating (AAWG) modules.
Figure 9:
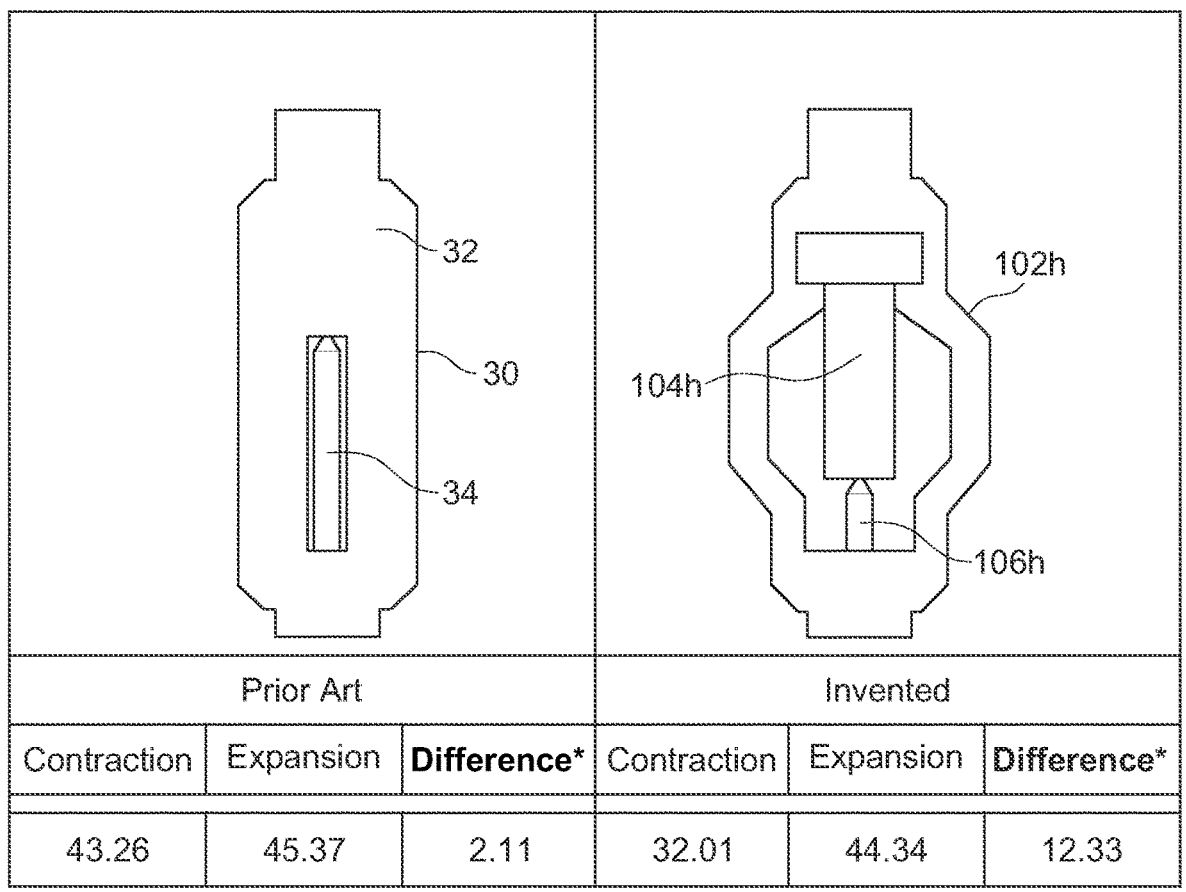
FIG. 9 is a schematic view comparing the conventional PRIOR ART thermal compensator, as illustrated within FIG. 3, with the new and improved thermal compensator of the present invention, as illustrated within FIGS. 4 and 6h, wherein the overall contract, expansion, and movement of displacement differential is noted in micro-meters.

With reference being made to FIG. 9, there is illustrated schematic views of the conventional PRIOR ART thermal compensator, as was illustrated within FIG. 3, and the new and improved thermal compensator of the present invention, as was illustrated within FIGS. 4 and 6*h*, wherein the overall contract, expansion, and movement of displacement differential is noted in micro-meters. Since the bow-shaped frame is more flexible with respect to its shape change, it can be retarded much more in contraction by means of a central bar that has a smaller coefficient of thermal expansion (CTE) in a cold environment than prior art thermal compensators by means of a factor of 5 or more. More particularly, as a non-limiting example, it can be seen that with the conventional PRIOR ART thermal compensator 30, when the thermal compensator 30 contracted under cold temperature conditions, its overall length dimension was 43.26 micro-meters, whereas when the thermal compensator 30 expanded under hot temperature conditions, its overall length dimension was 45.37 micro-meters, wherein the differential in its overall length dimension was 2.11 micro-meters. On the other hand, with the new and improved thermal compensator 102*h* contracted under cold temperature conditions, its overall length dimension was 32.01 micro-meters, whereas when the thermal compensator 102*h* expanded under hot temperature conditions, its overall length dimension was 44.34, wherein the differential in its overall length dimension was 12.33. As can therefore be clearly appreciated from such statistics, a greater length dimension differential was able to be achieved by means of the thermal compensator 102*h* of the present invention as compared with the conventional PRIOR ART thermal compensator 30. Accordingly, greater differential movements of the movable sections of the athermal arrayed waveguide grating (AAWG) module are possible when utilizing the thermal compensator 100 of the present invention, as opposed to utilizing the conventional PRIOR ART thermal compensator 30, so as to, in turn, achieve larger differential movements or displacements of the movable sections of the athermal arrayed waveguide grating (AAWG) modules 152, 152' which permits more precise focusing of the incoming light over greater differential temperature ranges.

It is lastly noted that the bow-shaped frame member 102, the central bar member 104, the screw 106, the protection block 130, and the expansion-enhancement block 132 of the thermal compensator 100 may be fabricated from any one of a multitude of different materials which exhibit various different coefficients of thermal expansion (CTE) so as to achieve optimum expansion and contraction results. Examples of such materials are steel, iron, stainless steel, copper, aluminum, nickel, zinc, cobalt, magnesium, kovar, brass, lead, graphite, carbon, rubber, ceramic, wood, epoxy, anodized aluminum, tin, gold, palladium, silver, molybdenum, platinum, titanium, chromium, manganese, various plastics, alloys, polytetrafluoroethylene, polycarbonate, vinyl, and the like. The materials may be selected for their various properties including, for example, in addition to their coefficients of thermal expansion (CTE), their strength, force, flexibility, stiffness, yield strength, brittleness, and the like, in order to achieve predeterminedly required movements, reliability, and/or other performance characteristics. In addition, the attachment of the thermal compensator 100 to the athermal arrayed waveguide grating (AAWG) modules 152, 152' may be accomplished by any suitable means such as, for example, screws, epoxies, adhesives, bolts, nuts, posts, holes, slots, tongues and grooves, cams, gears, ratchets, magnets, solder, welds, wires, friction fits, snap fittings, latch fittings, and the like.

Obviously, many variations and modifications of the present invention are possible in light of the above teachings. It is therefore to be understood that within the scope of the appended claims, the present invention may be practiced otherwise than as specifically described herein.

What is claimed is:

1. A thermal compensator for use in conjunction with an athermal arrayed waveguide grating (AAWG) module utilized for achieving wavelength multiplexing and de-multiplexing within optical networks, comprising:
   a bow-shaped frame member adapted to be connected to an athermal arrayed waveguide grating (AAWG) module; and
   a central bar member attached having a first end portion attached to a first end section of said bow-shaped frame member;
   wherein said bow-shaped frame member is fabricated from a first predetermined material which has a first coefficient of thermal expansion (CTE), and said central bar member is fabricated from a second predetermined material which has a second coefficient of thermal expansion (CTE) which is less than said first coefficient of thermal expansion (CTE) of said first predetermined material comprising said bow-shaped frame member.

2. The thermal compensator as set forth in claim 1, wherein:

under relatively high temperature conditions, said bow-shaped frame member will expand at a greater rate than will said central bar member, whereas under relatively low temperature conditions, contraction of said central bar member, at a rate slower than the contraction of said bow-shaped frame member, will effectively retard the contraction of said bow-shaped frame member.

3. The thermal compensator as set forth in claim 2, wherein:
under said relatively high or relatively low temperature conditions, said bow-shaped frame member will expand and contract such that the incoming light path, of light coming into said athermal arrayed waveguide grating (AAWG) module, will experience an angular shift which is less than a predetermined range or error relative to the incoming light path under average temperature conditions.

4. The thermal compensator as set forth in claim 1, wherein:
said bow-shaped frame member defines a central hollow portion within which said central bar member is disposed.

5. The thermal compensator as set forth in claim 1, further comprising:
a screw having a first end portion thereof threadedly engaged within a second opposite end section of said bow-shaped frame member and a second end portion engaged with a second end portion of said central bar member such that said second end portion of said central bar member will be disposed in engagement with said screw when said thermal compensator has fully contracted under cold temperature conditions.

6. The thermal compensator as set forth in claim 1, wherein:
said central bar member has a substantially T-shaped configuration with a transversely oriented head section of said T-shaped central bar member engaged with said first end section of said bow-shaped frame member, while a foot section of said T-shaped central bar member engaged with said second end portion of said threadedly adjustable screw.

7. The thermal compensator as set forth in claim 5, wherein:
said screw is fabricated from a predetermined material having a Young's Modulus greater than the Young's Modulus of said central bar member; and
a protection block, fabricated from a predetermined material having a Young's Modulus which is substantially the same as the Young's Modulus of said screw, is fixedly secured to said second end portion of said central bar member such that said screw cannot damage said central bar member when said second end portion of said central bar member is engage with said second end portion of said screw.

8. The thermal compensator as set forth in claim 1, further comprising:
an expansion-enhancement block fixedly secured to an external surface portion of said first end section of said bow-shaped frame member, wherein said expansion-enhancement block is fabricated from a predetermined material which has a coefficient of thermal expansion (CTE) which is greater than the coefficient of thermal expansion (CTE) of said bow-shaped frame member such that said first end section of said bow-shaped frame member can expand at a greater rate than other sections of said bow-shaped frame member.

9. The thermal compensator as set forth in claim 1, wherein:
said bow-shaped member comprises leg portions which are effectively mirror-images of each other.

10. The thermal compensator as set forth in claim 1, wherein:
said bow-shaped member has a substantially hexagonal configuration.

11. The thermal compensator as set forth in claim 1, wherein:
said bow-shaped frame member has a substantially diamond-shaped configuration.

12. The thermal compensator as set forth in claim 1, wherein:
said bow-shaped member has a pair of leg members interconnecting said first and second end sections together; and
wherein both of said pair of leg members are arcuately configured.

13. The thermal compensator as set forth in claim 1, wherein:
said bow-shaped member has a pair of leg members interconnecting said first and second end sections together; and
wherein a first one of said pair of leg members is arcuately configured while the second one of said pair of leg members comprises one half of a diamond.

14. The thermal compensator as set forth in claim 4, wherein:
said bow-shaped member has a pair of leg members interconnecting said first and second end sections together; and
wherein both of said pair of leg members define sides of said hexagon but have portions which vary in thickness.

15. The thermal compensator as set forth in claim 6, wherein:
said bow-shaped member has a pair of leg members interconnecting said first and second end sections together; and
said first end section of said bow-shaped frame member is provided with a chamber for accommodate said head portion of said T-shaped central bar member.

16. The thermal compensator as set forth in claim 1, wherein:
said central bar member has a configuration which is selected from the group comprising a cylindrical rod having a circular cross-section, a rod forming a rectangular parallelepiped, a substantially T-shaped configuration comprising a body portion and a transversely oriented head section wherein said head section of said T-shaped central bar member has a width dimension which is only approximately one half the width dimension of said body portion, a substantially T-shaped configuration comprising a body portion and a transversely oriented head section wherein said head section of said T-shaped central bar member has a approximately one corner or one quadrant removed from said head section, and a substantially T-shaped configuration comprising a body portion, extending along a longitudinal axis, and a transversely oriented head section wherein said body portion projects a predetermined distance beyond the axial disposition of said head section of said T-shaped central bar member, upon said body portion of said T-shaped central bar member, as considered along said longitudinal axis of said body portion.

17. The thermal compensator as set forth in claim 1, wherein:

said bow-shaped frame member and said central bar member may be fabricated from any material exhibiting predetermined coefficients of thermal expansion (CTE) so as to achieve optimum expansion and contraction results, wherein said material is selected from the group comprising steel, iron, stainless steel, copper, aluminum, nickel, zinc, cobalt, magnesium, kovar, brass, lead, graphite, carbon, rubber, ceramic, wood, epoxy, anodized aluminum, tin, gold, palladium, silver, molybdenum, platinum, titanium, chromium, manganese, various plastics, alloys, polytetrafluoroethylene, polycarbonate, and vinyl.

18. An athermal arrayed waveguide grating (AAWG) module utilized for achieving wavelength multiplexing and de-multiplexing with optical networks, comprising:

a housing;

a fixed component;

a movable component; and a thermal compensator, comprising a bow-shaped frame member having a fixed end section and a movable end section adapted to be connected to said movable component of said athermal arrayed waveguide grating (AAWG) module so as to move or displace said movable component of said athermal arrayed waveguide grating (AAWG) module when said bow-shaped frame member expands and contracts under hot and cold temperature conditions, and a central bar member attached having a first end portion attached to said movable end section of said bow-shaped frame member, wherein said bow-shaped frame member is fabricated from a first predetermined material which has a first coefficient of thermal expansion (CTE), and said central bar member is fabricated from a second predetermined material which has a second coefficient of thermal expansion (CTE) which is less than said first coefficient of thermal expansion (CTE) of said first predetermined material comprising said bow-shaped frame member, whereby under hot temperature conditions, said bow-shaped frame member will expand at a greater rate than will said central bar member, whereas under cold temperature conditions, contraction of said central bar member, at a rate slower than the contraction of said bow-shaped frame member, will effectively retard the contraction of said bow-shaped frame member such that said athermal arrayed waveguide grating (AAWG) module can maintain the proper focus of light coming into said athermal arrayed waveguide grating (AAWG) module in order to achieve proper wavelength multiplexing and de-multiplexing within said optical networks.

19. The athermal arrayed waveguide grating (AAWG) module as set forth in claim 18, wherein:

said movable component of said athermal arrayed waveguide grating (AAWG) module comprises a fractional portion of said athermal arrayed waveguide grating (AAWG) module.

20. The athermal arrayed waveguide grating (AAWG) module as set forth in claim 18, wherein:

said athermal arrayed waveguide grating (AAWG) module is effectively divided into half section such that said movable component of said athermal arrayed waveguide grating (AAWG) module comprises a first half of said athermal arrayed waveguide grating (AAWG) module while said fixed component of said athermal arrayed waveguide grating (AAWG) module comprises a second half of said athermal arrayed waveguide grating (AAWG) module.

* * * * *